Figure 3:
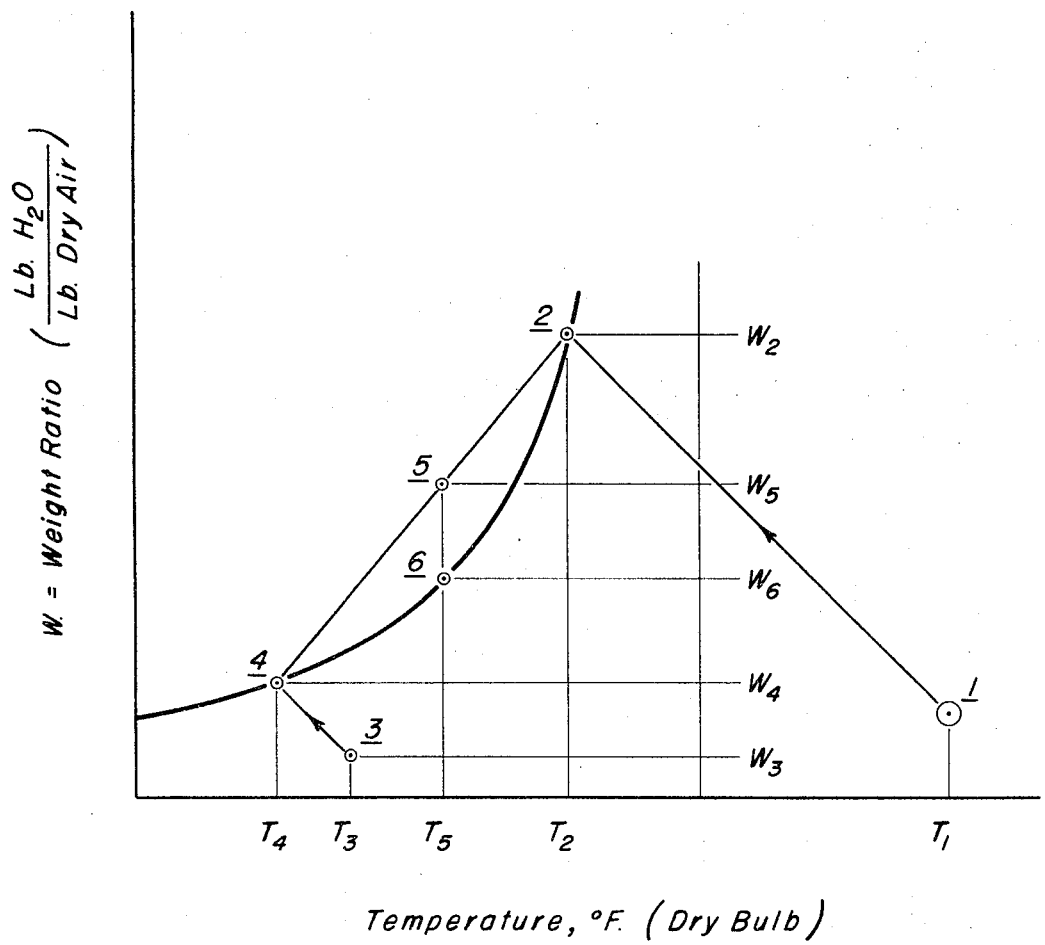

United States Patent [19]
Hardison

[11] 3,755,990
[45] Sept. 4, 1973

[54] METHOD OF COLLECTING SUB-MICRON PARTICLES FROM A HOT GAS EFFLUENT STREAM

[75] Inventor: Leslie C. Hardison, Darien, Conn.

[73] Assignee: Universal Oil Products Company, Des Plaines, Ill.

[22] Filed: May 8, 1972

[21] Appl. No.: 251,512

Related U.S. Application Data

[63] Continuation of Ser. No. 23,370, March 27, 1970, abandoned.

[52] U.S. Cl............ 55/93, 55/222, 55/233, 55/240, 55/250, 55/259, 261/17, 261/133, 261/DIG. 54
[51] Int. Cl............................................. B01d 47/06
[58] Field of Search ............... 55/71, 73, 80, 83, 55/84, 90, 93, 94, 222, 223, 233, 238, 240, 250, 259; 261/17, 16, 115–117, 128, 133, DIG. 54

[56] References Cited
UNITED STATES PATENTS

| | | | |
|---|---|---|---|
| 2,729,301 | 1/1956 | Ekstrom, Jr. | 261/DIG. 9 |
| 3,487,607 | 1/1970 | Cox | 55/222 |
| 3,582,262 | 6/1971 | Tomany | 55/72 |

FOREIGN PATENTS OR APPLICATIONS

| | | | |
|---|---|---|---|
| 376,475 | 5/1964 | Switzerland | 55/80 |

Primary Examiner—Bernard Nozick
Attorney—James R. Hoatson, Jr. et al.

[57] ABSTRACT

A hot gaseous effluent having a high percentage of sub-micron sized particles is mixed with a hot saturated gas stream and then subjected to rapid cooling so as to provide a fog and condensation of water droplets around solid particles in the gas stream. The resulting gas stream with enlarged particles is then passed to wet scrubber means so that particles can be removed and a cleaned gas stream discharged from the system.

8 Claims, 3 Drawing Figures

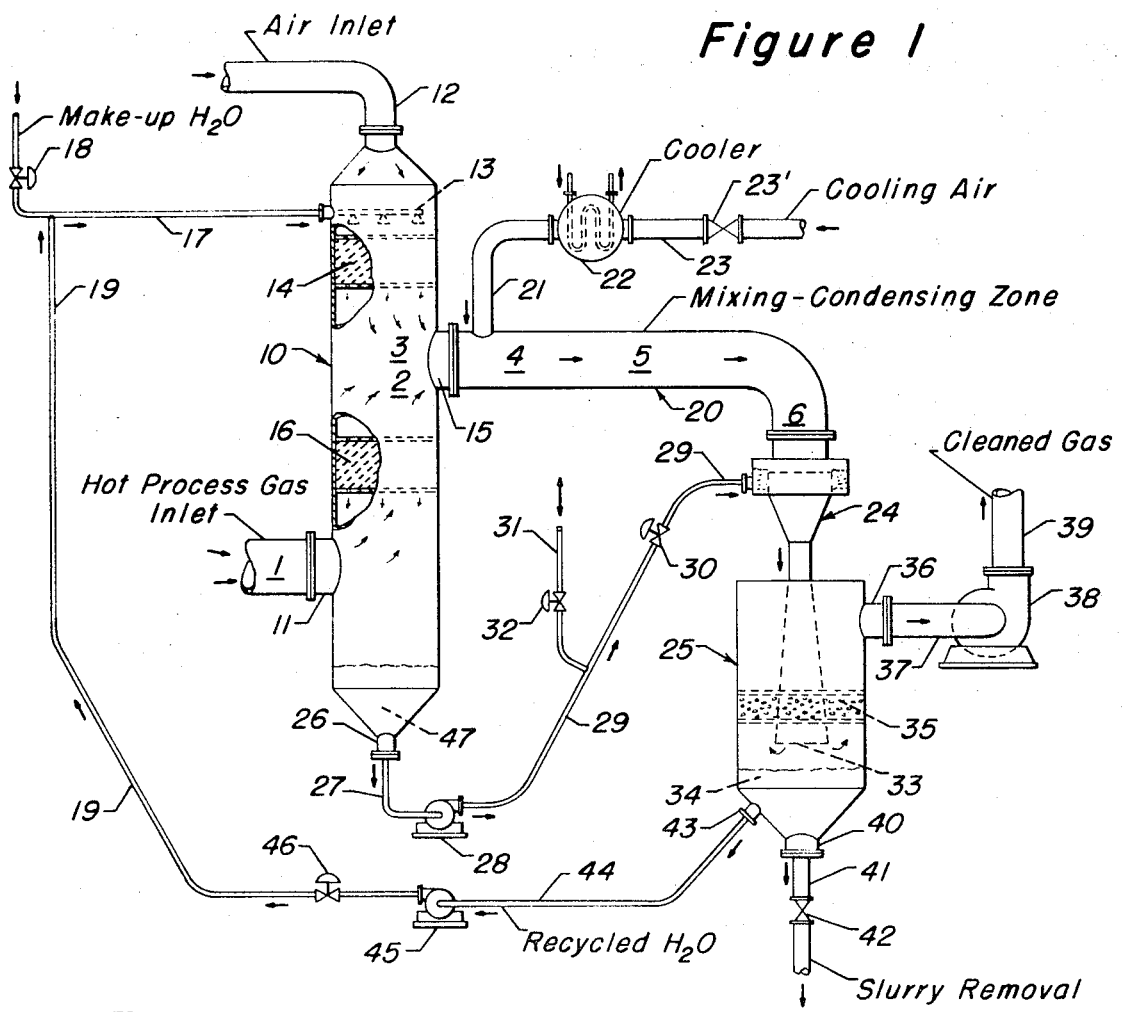
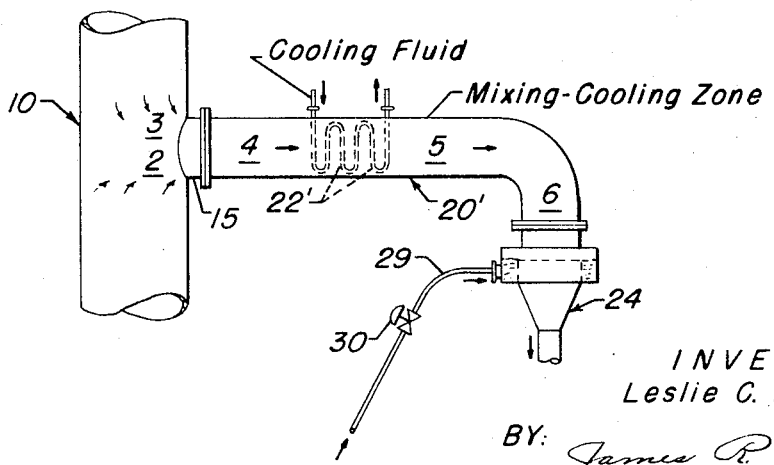

METHOD OF COLLECTING SUB-MICRON PARTICLES FROM A HOT GAS EFFLUENT STREAM

This is a continuation of application Ser. No. 23,370, filed Mar. 27, 1970 now abandoned.

This invention relates to an improved method for removing fine particles from a hot gaseous stream. More particularly, the invention is directed to a system for mixing a vapor laden stream into a particle laden stream and cooling the mixture to provide a fog and condensation of water droplets around entrained particles such that the thusly enlarged particles can be removed in generally conventional particle removal means.

Various methods have been used or are being used for effecting the removal of sub-micron sized fine particles from laden streams; however, most of these methods are expensive to carryout or do not provide desired efficiencies. Such methods have primarily included wetting and agglomeration of particles or causing bipolar electrostatic charging of the stream to in turn effect an agglomeration of the fine particles whereby substantially conventional scrubber or precipitor means can be utilized with a suitable efficiency level.

By way of example, oil fired boiler flue gas, glass melt furnace gases; aluminum chlorination furnace effluent; and the like, may be considered illustrative of hot process gas streams which carry sub-micron sized particulates that are difficult to remove or collect. However, where particle sizes that are from the order of 0.25 to 0.75$\mu$ can be increased to 1$\mu$ and larger then centrifugal separation or wet collection means can be used with a relatively high efficiency.

In any event, it is a principal object of the present invention to utilize a fog forming system as a means for increasing the individual particle sizes so that generally conventional particle removal means can be employed.

It may be considered another object of the invention to use a chilled air stream to combine with a highly humidified or saturated hot gas stream that has sub-micron sized particles such that the final mixture is supersaturated and water droplets can form around the entrained fine particles to increase their size for a subsequent effective removal in what might be considered any of the conventional forms of collectors or particle separator means.

In a broad embodiment, the present invention provides a method for removing fine particulates that are normally difficulty removable from a hot particle laden effluent gas stream in a manner which comprises the steps of: (a) adding water to said hot laden gas stream to effect humidification and partial cooling thereof, (b) providing a separate gaseous stream with a high concentration of water vapor, (c) effecting the mixing of the latter stream with the humidified particle laden stream in a mixing-condensing zone, (d) providing a relatively rapid cooling of the resulting mixed streams in such zone to effect fog formation and an accompanying condensation of water onto entrained particulates, and (e) passing resulting effectively enlarged particles, i.e., water coated particles in the mixed gas stream from the mixing-condensing zone to a particle removal zone to thereby provide for the discharge of a cleaned gas stream therefrom.

In another aspect, the present invention provides an improved system or apparatus arrangement for removing fine particles from a particle laden hot effluent gas stream, which comprises in combination, a gas saturation chamber having separate inlet means for said hot gas stream and for a saturating gas stream, said chamber further having water inlet means thereto and internal water distributing means traversing the paths of the gas streams therein to effect a saturation thereof, an outlet from said chamber connecting to a mixing-condensing section and cooling means connective with the interior of said mixing-condensing section whereby to provide water droplet condensation on entrained particles in the mixed gas stream, means connecting said mixing-condensing section to a particle scrubber means, with said scrubber means having at least a particle discharge means and a cleaned gas outlet, whereby a resulting cooled and cleaned effluent gas stream is discharged from the system.

Various procedures may be used to effect the supersaturation of the mixed gas stream whereby there will be fogging conditions and condensation of water droplets on entrained particles, as for example, there may be chilling of the resulting gas stream by indirect cooling; a pressuring of the gas stream so as to bring about condensation of the water content; and the use of a diluting and cooling air stream or other gas, such that a resulting lowered temperature will result in supersaturated conditions and condensation of entrained water vapor into fog and water droplets that in turn can collect around particulate manner. It is, of course, a principal object of the invention to effect the condensation in a manner where the entrained particulates will serve as nuclei whereby water droplets or condensate will effect growth large enough to provide for efficient collection thereof within generally conventional types of scrubbers or particle collector means.

Inasmuch as the compression of a particle laden stream has the disadvantage of requiring a compressor to handle a "dirty" stream, it is generally advisable to utilize a different method of condensation. Also, in utilizing a system that utilizes indirect cooling or cold air or cold water heat exchange means, there will be the undesirable condensation of water directly on the cooling coil means that is positioned within the mixing-condensing zone. A net result is a lessening of water condensation on the particles such that they may be enlarged to pass on into the scrubber or other collector type means.

A generally preferable arrangement utilizes the direct introduction of a cooling gas stream, such as air, whereby there may be the intermixing of the cooling stream with the mixture of humidified gas and humidified process gas stream throughout an elongated mixing-water condensing zone. The introduction of the cooled gas into a substantially saturated mixed gas stream will in turn provide the desired fogging and condensation of water droplets on the entrained particulates so that enlarged particles will carry from the mixing zone to a downstream particle separation zone. As hereinbefore set forth, it is desired that the sub-micron sized particles will be increased to at least about 1 micron size whereby a centrifugal separator or a suitable scrubber means will effect a high efficiency particle removal. However, in the handling of particles as small as 1 micron to the order of 10 micron size, it is generally desirable that a scrubber of the venturi type or of the countercurrent flow type be utilized to insure a high level efficiency of particle removal.

Reference to the accompanying drawings and the following descriptions thereof will serve to more clearly set forth the improved method for effecting an increase in particle size as well as improved means for effecting the separation of the particulates from the laden gas stream. Variations in the processing system as well as additional advantageous features will also be set forth in connection with the description of the drawings.

FIG. 1 of the drawing indicates a diagrammatic processing arrangement providing for the saturation of a hot process gas stream and the subsequent cooling thereof to provide condensing conditions which will permit separation of particles enlarged by water condensation thereon.

FIG. 2 of the drawing is a partial view indicating an indirect cooling in the mixing and cooling zone so as to provide supersaturation and water condensing conditions within an elongated mixing-cooling zone.

FIG. 3 show a modified and partial psychrometric diagram with points and lines indicating the humidification and resulting supersaturation of a mixed gas stream so as to create the condensation of water droplets on the entrained particulates whereby such particulates will effectively grow large enough for collection and removal purposes.

With particular reference to FIG. 1 of the drawing, there is indicated a vertically elongated saturation chamber 10 adapted to receive a hot particle laden process gas stream by way of inlet means 11 and an ambient air stream by way of inlet means 12. The latter is indicating flow downwardly through the upper portion of the chamber around water inlet spray means 13 and through packing means 14 such that air with a high concentration of water vapor will reach point 3 for discharge from the chamber 10 by way of outlet 15. At the same time, the hot process stream will pass upwardly through descending droplets of water and through the packing in zone 16 such that the resulting cooled and humidified laden gas will reach point 2 for discharge through outlet 15 and for intermixing with the saturated air stream coming down from the top of the column 10. Water for the spray means 13 is indicated in the present embodiment as being provided by line 17, with control valve means 18, and from line 19 which connects with outlet means from a gas scrubber zone that will be more fully described hereinafter.

In accordance with the present illustrated embodiment, the mixed gas discharge from outlet 15 of chamber 10 connects with and discharges into an elongated mixing-condensing chamber 20 such that there may be condensation of water onto the particulates. The present mixing-condensing zone 20 is also adapted to receive a cooled air stream from conduit 21 which connects to cooler 22 and air supply line 23 with control valve 23'. The latter arrangement provides alternative or additional cooled air to the zone 20. Although not shown in the drawing, there may be baffles or other types of flow mixing means provided within the elongated zone 20 such that there is intermixing of the combined gas streams from chamber outlet 15 and of the cold air stream from conduit 21 whereby to effect the desired cooling and supersaturation of the mixed laden gas stream. As hereinbefore set forth, the cooling of the gas stream, after being provided with a high content of water vapor, will effect desired fogging conditions so that all entrained particulate matter will serve as condensation nuclei and water droplets can grow thereon to effect increased particle sizes that will be large enough to enhance the collection capabilities of generally conventional scrubber means.

The present embodiment indicates the outlet of the elongated mixing-condensing zone 20 as connecting with the upper portion of a downwardly projecting venturi type scrubber 24 in turn discharging into an enlarged separating chamber 25. The scrubbing water provided for the upper end of venturi scrubber 24 may be from any convenient source; however, preferably, water may be supplied from the lower end of the saturation chamber 10 by way of outlet 26, line 27, pump means 28, and line 29 with control valve means 30. Water addition or liquid withdrawal may be made from line 29 by means of line 31 having control valve 32.

Within the separation chamber 25, there will be a downward inpingement of water and particulates from the lower extremity 33 of scrubber means 24 into a liquid reservoir zone 34 and then a reversal of the gas flow above the liquid level so as to pass upwardly through the mist extraction zone 35. The latter may, for example, comprise one or more stages of fixed packing or preferably be of light weight spherical elements which can be lifted and rotated within the path of the flow gas stream so as to effectively remove entrained water from such stream. A resulting substantially cleaned process gas stream, together with added air, may be discharged from the chamber 25 by way of outlet means 36 and conduit 37 which connects with a blower means 38 and an outlet stack 39. At the lower end of separator chamber 25, there is indicated a discharge nozzle 40 connecting with a line 41 having control valve 42 such that there may be a removal of slurry with separated particulates from the system. There is also indicated a lower outlet 43 connecting with line 44 such that there may be a recycle of water by way of pump means 45 and line 19, with valve 46, to the inlet line 17 and spray means 13 within the upper portion of saturating chamber 10.

It is to be pointed out that the venturi scrubber 24 and particle separator means 25 of FIG. 1 merely illustrate one form of efficient particle separator means and that other types of scrubbers may well be utilized in effecting the ultimate removal of wetted particulates that have a general size of the order of 1 micron or greater. For example, floating bed scrubbers of the type illustrated in U. S. Pat. Nos. 3,122,594 and 3,350,075, with one or more stages of light weight contact elements, may be used to advantage.

With reference to FIG. 2 of the drawing, there is indicated a portion of the saturating chamber 10 discharging a mixed gas phase with a high water content into an elongated mixing-cooling zone 20' which in this instance is diagrammatically indicated as being cooled indirectly from a cooling coil means 22'. The latter, in accordance with the present invention, shall provide sufficient cooling of the entering mixed gas stream so as to effect a supersaturated condition therein and the resulting condensation of water droplets onto entrained fine particulates. As a result, they will effectively grow in size so as to be more efficiently collected in a downstream separation zone, such as by a venturi scrubber means 24.

It will be noted in connection with the present embodiment, as well as with respect to the operation of FIG. 1, that there is no agglomeration of entrained fine particulates, but instead, an enlargement of the individual particles by virtue of each particle serving as a nuclei for water droplet formation from fogging conditions being maintained in the elongated mixing zone. It may be further noted that the present system eliminates the problems of having excessive water addition and attempted agglomeration of particles ahead of a particle separator section.

Various modifications may be made in the design and operation of a saturation section such as carried out by the present vertical chamber 10; however, utilization of a vertically oriented chamber has an advantage in permitting gravity flow of the distributed water stream through packed zones such that there may be efficient intermixing or contact with cocurrent and/or countercurrent gaseous streams. At the same time, there is the advantage of having a lower water collection zone such as 47 whereby excess water may be collected and utilized in accompanying interconnected processing equipment. Although not shown, water from the lower end of chamber 10 may also be recycled to the upper end of the chamber to be admixed with or supply the major portion of make-up liquid for spray means 13.

With reference to FIG. 3 of the drawing, there is shown in an illustrative psychrometric diagram a point 1 which is representative of the inlet temperature of a relatively hot process gas stream, such as would enter the processing system of FIG. 1 by way of inlet means 11. This process gas stream would be humidified and partially cooled by the adiabatic addition of water so as to bring such gas stream to the at least partially saturated condition indicated as point 2 on the diagram. At the same time, ambient air, represented by point 3 on the diagram, is introduced into the system and is subjected to humidification and partial cooling so as to bring about the condition of temperature and saturation as shown as point 4 on the diagram. With mixing of the two gas streams, and with a high degree of water vapor content present, there will be the resultant mixed gas stream represented by the straight line connecting between points 2 and 4. Also, with sufficient cooling, there is the final supersaturated mixture such that water condenses out of the gaseous mixture along the line between points 5 and 6 on the diagram. In other words, point 6 will represent the final state or condition for the process gas-air mixture containing a significant amount of fog and condensed liquid water on entrained particulates. As the latter will effectively increase in size, they are removed in the downstream particle removal means. For purposes of clarification, and to further illustrate the conditions taking place in the processing system, the points 1 through 6 are diagrammatically located within FIG. 1 of the drawing.

It should be pointed out that the diagram of FIG. 3 is not to any particular scale and is merely diagrammatic in its representing a portion of a conventional psychrometric diagram, where dry bulb temperatures ($T_1$ to $T_5$) are presented with respect to the weight ratios ($W_2$ to $W_4$) as pounds of water to pounds of dry air. Such diagrams are discussed in readily available literature and need not be explained in detail herein.

Inasmuch as the diagram of FIG. 3 is illustrative of one method of effecting cooling and condensation, it should be noted that the locations of the various points will in turn vary depending upon temperature conditions and the degree of saturation accomplished by water additions as well as the effectiveness of the cooling and condensing step within the mixing-condensing zone of the system. Also, where the chilling or cooling is accomplished by heat exchange means versus chilled air addition, etc., there will be variations in the location of the points and the slopes of lines in the diagram of FIG. 3.

The present drawing for the aforedescribed processing system, indicates the use of air as a cooled and saturated gas stream which is intermixed with the hot process gas stream; however, where a particular process stream may require the use of a medium other than air, then carbon dioxide, nitrogen or other inert medium may be used to advantage to effect the intermixing and cooling and saturation of the laden process stream. Still other variations in processing conditions or with respect to apparatus modifications may be made by those skilled in the art and be considered within the scope of the present invention.

I claim as my invention:

1. A method for removing fine particulates of less than 0.75 micron size that are normally difficult to remove from a hot effluent gas stream in a manner which comprises the steps of:

a. adding water to said hot gas stream to effect humidification and partial cooling thereof, b. providing a separate gaseous stream at a temperature lower than said hot gas stream with a high concentration of water vapor, c. effecting the mixing of the latter stream with the humidified particle laden stream in an external mixing-condensing zone, d. relatively rapidly cooling the resulting mixed streams by injection of an externally cooled air stream into said mixing-condensing zone to effect fog formation and an accompanying condensation of water vapor onto entrained particulates, and e. passing the mixed gas streams including the resulting individual particulates carrying condensed water thereon to increase the combined water-particulate size thereof to at least 1 micron resulting from the mixing-condensing chamber to a particle removal zone to separate the particulates and discharging said gas stream having said particulates removed therefrom.

2. The method of claim 1 further characterized in that said hot particle laden stream is introduced into the lower portion of a vertically oriented saturation zone to pass countercurrent to a descending liquid flow and said separate gaseous stream is introduced to the upper portion of the saturation zone to flow concurrently with water spray addition thereto, whereby a separately humidified gas stream may combine with the laden gas stream and a comingled gaseous stream discharged from the saturation zone to said mixing-condensing zone.

3. The method of claim 1 further characterized in that the mixed gas stream from the mixing-condensing zone with entrained particulates carrying condensed water thereon is introduced into a down flowing venturi scrubber zone and water is supplied to the throat of said venturi scrubber zone that is collected and transferred from the saturation zone effecting water addition to the laden gas stream.

4. A system for removing fine particulates from a particle laden hot effluent gas stream, which comprises in combination, a gas saturation chamber having inlet means for said hot gas stream, an additional inlet for a gas stream, cooler than said hot gas stream said chamber further having water inlet means thereto and internal water distributing means traversing the paths of the gas streams therein to effect a saturation thereof, a gas outlet from said chamber, a mixing-condensing chamber connected with said gas outlet, external air conduit and cooling means connected with the interior of said mixing-condensing chamber to inject cool air therein whereby to provide water droplet condensation on entrained particles in the mixed stream, means connecting said mixing-condensing chamber to a particle scrubber means, and said scrubber means having at least a particle discharge means and a cleaned gas outlet, whereby a resulting cooled and cleaned effluent gas stream is discharged from the system.

5. The system of claim 4 further characterized in that a cooled gas inlet means connects with said mixing-condensing section at the upper end thereof, whereby a chilled gaseous stream may be intermixed with the laden gas stream being discharged from the gas saturation chamber.

6. The system of claim 4 further characterized in that said mixing-condensing section is provided with indirect heat exchange means across the interior thereof, whereby the gas mixture flowing therethrough will be subjected to cooling and supersaturation conditions and such that resulting water droplets may form on entrained particles.

7. The system of claim 4 further characterized in that the particle scrubber means provides for a downflow into a venturi type scrubber and water is provided to the throat of said scrubber from conduit means connecting with the lower portion of said gas saturation chamber.

8. The system of claim 4 further characterized in that said gas saturation chamber is vertically disposed and has a lower hot gas stream inlet, an upper air inlet, an intermediate mixed gas stream outlet, and separate contact means are positioned between each of said inlets and said outlet whereby the hot gas stream and air inlet stream may each be separately subjected to humidification; a water inlet and distributing means positioned in the upper portion of said chamber whereby water may be distributed downward throughout the length thereof and into contact with each contact means, and water conduit means connected between said scrubber means and said water distributing means whereby at least a portion of the water to the latter is obtained from said scrubber means.

* * * * *